United States Patent
Davis et al.

(10) Patent No.: US 6,461,273 B1
(45) Date of Patent: Oct. 8, 2002

(54) AUTOMATED TRANSMISSION UPSHIFT BRAKE CONTROL

(75) Inventors: Alan Davis, Plainwell, MI (US); Don Rozsi, Marshall, MI (US); Jon A. Steeby, Lymm (GB)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/873,015

(22) Filed: Jun. 1, 2001

(51) Int. Cl.[7] .................... F16H 59/64; F16H 59/30
(52) U.S. Cl. .................................... 477/98; 477/124
(58) Field of Search .......................... 74/336 R; 477/98, 477/118, 124, 120

(56) References Cited

U.S. PATENT DOCUMENTS

| | | | |
|---|---|---|---|
| 4,361,060 A | 11/1982 | Smyth | 74/866 |
| 4,507,736 A | 3/1985 | Klatt | 477/123 |
| 4,576,065 A | 3/1986 | Speranza et al. | 477/124 |
| 4,576,263 A | 3/1986 | Lane et al. | 192/0.044 |
| 4,595,986 A | 6/1986 | Daubenspeck et al. | 364/424.1 |
| 4,648,290 A | 3/1987 | Dunkley et al. | 477/78 |
| 4,850,236 A | 7/1989 | Braun | 74/337 |
| 4,913,269 A | 4/1990 | Dunkley et al. | 192/3.63 |
| 4,947,331 A | 8/1990 | Speranza | 364/424.1 |
| 5,172,609 A | 12/1992 | Nitz et al. | 74/866 |
| 5,219,391 A | 6/1993 | Edelen et al. | 74/335 |
| 5,272,939 A | 12/1993 | Markyvech | 74/866 |
| 5,335,566 A | 8/1994 | Genise | 74/335 |
| 5,389,053 A | 2/1995 | Steeby et al. | 477/123 |
| 5,390,561 A | 2/1995 | Stine | 74/331 |
| 5,409,432 A | 4/1995 | Steeby | 477/71 |
| 5,425,689 A | 6/1995 | Genise | 477/120 |
| 5,435,212 A | 7/1995 | Menig | 74/745 |
| 5,479,345 A | 12/1995 | Amsallen | 364/424.1 |
| 5,487,004 A | 1/1996 | Amsallen | 364/424.1 |
| 5,489,247 A | 2/1996 | Markyvech | 447/120 |
| 5,490,063 A | 2/1996 | Genise | 364/424.1 |
| 5,509,867 A | 4/1996 | Genise | 477/120 |
| 5,533,946 A | 7/1996 | Markyvech | 477/78 |
| 5,582,069 A | 12/1996 | Genise | 74/335 |
| 5,620,392 A | 4/1997 | Genise | 477/120 |
| 5,655,407 A | 8/1997 | Dresden et al. | 74/336 |
| 5,679,093 A | 10/1997 | Desautels | 477/124 |
| 5,713,445 A | 2/1998 | Davis et al. | 192/35 |
| 5,737,978 A | 4/1998 | Stine | 74/606 |
| 5,743,143 A | 4/1998 | Carpenter et al. | 74/335 |
| 5,766,111 A | 6/1998 | Steeby et al. | 477/124 |
| 5,944,630 A | 8/1999 | Omote | 74/335 |
| 6,017,291 A * | 1/2000 | Ailes et al. | 477/124 |
| 6,123,643 A | 9/2000 | Davis et al. | 477/92 |
| 6,149,545 A | 11/2000 | Genise et al. | 477/124 |
| 6,325,743 B1 * | 12/2001 | Genise et al. | 477/124 |
| 6,409,629 B1 * | 6/2002 | Davis | 477/98 |

* cited by examiner

Primary Examiner—Charles Marmor
Assistant Examiner—Roger Pang
(74) Attorney, Agent, or Firm—Kevin M. Hinman

(57) ABSTRACT

A method/system for controlling upshifting in an automated mechanical transmission system (10) utilized on a vehicle having an ECU (28) operated friction upshift brake (26) capable of applying two or more levels of retardation to a transmission input shaft (16).

7 Claims, 4 Drawing Sheets

AUTOMATED TRANSMISSION UPSHIFT BRAKE CONTROL

RELATED APPLICATIONS

This application is related to copending U.S. Ser. No. 09/573,873 filed May 17, 2000 and assigned to EATON CORPORATION, assignee of this application.

BACKGROUND OF THE INVENTION

1. Field of the Invention

The present invention relates to a control method/system for controlling upshifting in an at least partially automated mechanical transmission system. In particular, the present invention, in one preferred embodiment, relates to the control of upshifting in a vehicular automated mechanical transmission system wherein the system senses conditions indicative of a requirement for an upshift from a currently engaged gear ratio (GR) and evaluates, in sequence, the desirability of unaided upshifts and then upshift brake-assisted upshifts and commands upshifts deemed desirable.

More particularly, the present invention relates to a control method/system for controlling upshift brakes in potential upshift brake-aided upshifts as a function of one or more of the thermal characteristics of the upshift brake, the estimated current temperature of the brake, the period of time since the previous upshift brake-aided upshift and/or the expected heat energy generated by the previous upshift brake-aided upshift and/or the by the upshift under consideration at differing levels of brake caused retardation.

2. Description of the Prior Art

Fully or partially automated mechanical transmission systems for vehicular use are known in the prior art, as may be seen by reference to U.S. Pat. Nos. 4,361,060; 4,648,290; 4,722,248; 4,850,236; 5,389,053; 5,487,004; 5,435,212 and 5,755,639, the disclosures of which are incorporated herein by reference. The use of engine brakes (also known as compression brakes, exhaust brakes or Jake brakes) and transmission controls utilizing same are known in the prior art, as may be seen by reference to U.S. Pat. Nos. 5,409,432 and 5,425,689, the disclosures of which are incorporated herein by reference.

The use of friction devices to retard transmission input shaft rotation, such as inertia brakes (also known as upshift brakes or input shaft brakes) and actuators therefor, for providing quicker upshifts is known in the prior art, as may be seen by reference to U.S. Pat. Nos. 5,086,659 and 5,713,445, the disclosures of which are incorporated herein by reference.

Controls for automated mechanical transmission systems, especially wherein shifting is accomplished while maintaining the master clutch engaged, wherein single and/or skip shift feasibility is evaluated are known in the prior art, as may be seen by reference to U.S. Pat. Nos. 4,576,065; 4,916,979; 5,335,566; 5,425,689; 5,272,939; 5,479,345; 5,533,946; 5,582,069; 5,620,392; 5,489,247; 5,490,063; 5,509,867, and 6,149,545, the disclosures of which are incorporated herein by reference.

Controls for automated mechanical transmission systems including control of friction upshift brakes are known in the prior art as may be seen by reference to U.S. Pat. No. 6,123,643, the disclosure of which is incorporated herein by reference.

In the system described in U.S. Pat. No. 6,149,545, a control for a vehicular automated mechanical transmission system will sense conditions indicative of upshifting from a currently engaged gear ratio, will evaluate, in sequence, the desirability of large skip upshifts, then single skip upshifts, unaided single upshifts and then upshift brake-aided single upshifts, and will command an upshift to the first target ratio deemed to be feasible under current vehicle operating conditions.

The upshift feasibility rules comprise a two-part test, (a) can the upshift be completed above a minimum engine speed? and (b) when completed, will the engine, in the target ratio, provide sufficient torque at the drive wheels to allow at least a minimum vehicle acceleration? Feasibility of skip and/or single upshifts also may require that an upshift is expected to be completed within a period of time less than a maximum acceptable time ($T<T_{MAX}$?).

SUMMARY OF THE INVENTION

The control of the present invention relates to controlling a friction upshift brake which may be operated at two or more levels of retardation to provide variable additional deceleration, during a shift with the master clutch engaged, to a transmission input shift and the engine crank shaft and master clutch rotating therewith. This retardation is additive to the natural rate of deceleration of the engine called "engine speed decay" due to friction and the like. Actuation of the upshift brake will apply an added retarding force to the input shaft, clutch and, engine assembly to provide an additional deceleration of the input shaft.

To prevent undue wear and/or damage of friction-type upshift brakes, the predicted maximum deceleration available from the upshift brake without causing the brake to overheat ($TEMP_p<TEMP_{MAX}$) is estimated or simulated. This maximum deceleration is then compared to the deceleration necessary to complete a potential downshift.

If the additional deceleration needed to complete a shift above a minimal engine speed and/or within a maximum acceptable time exceeds the maximum additional deceleration the upshift brake can provide without damage, usually thermal damage, an upshift into the target gear is not commanded.

If an upshift is feasible, the upshift brake will be utilized to provide a degree of deceleration to allow the shift to occur above the minimum engine speed, and, if possible, within a desirable period of time (such as, for example, within 1.2 seconds for a heavy-duty truck).

Accordingly, an improved upshift control for automated mechanical transmissions is provided which will automatically evaluate and command an acceptable level of upshift brake actuation for a proposed upshift brake-aided upshifts and which provides thermal protection for the friction-type upshift brake.

This and other objects and advantages of the present invention will become apparent from a reading of the following description of the preferred embodiment taken in connection with the attached drawings.

DESCRIPTION OF THE PREFERRED EMBODIMENT

Figure 1:
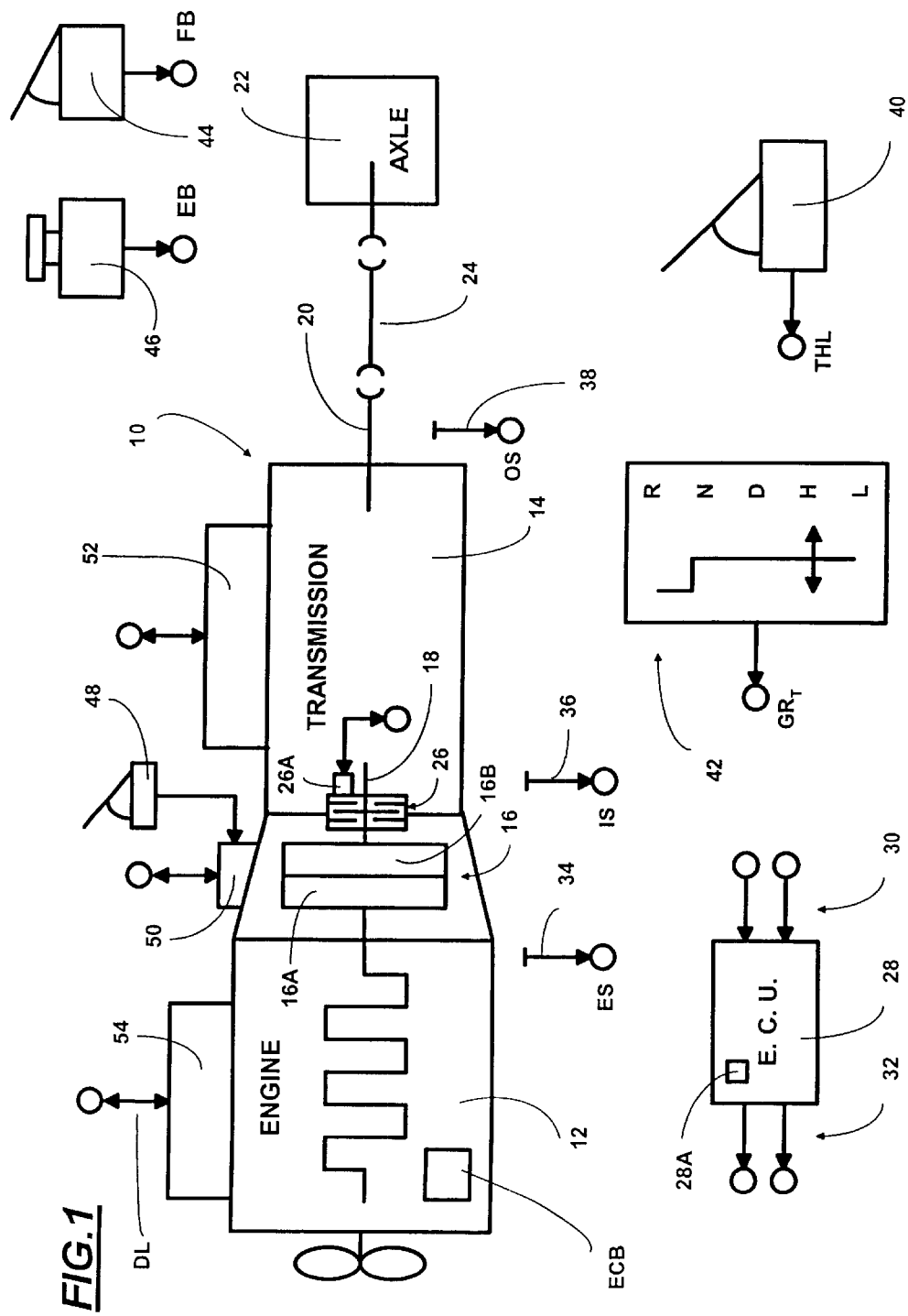
FIG. 1 is a schematic illustration, in block diagram format, of an automated mechanical transmission system utilizing the control of the present invention.

An at least partially automated mechanical transmission system intended for vehicular use is schematically illustrated in FIG. 1. The automated transmission system 10 includes a fuel-controlled engine 12 (such as a well-known diesel engine or the like), a multiple-speed, change-gear transmission 14, and a non-positive coupling 16 (such as a friction master clutch) drivingly interposed between the engine and the input shaft 18 of the transmission. The transmission 14 may be of the compound type comprising a main transmission section connected in series with a splitter- and/or range-type auxiliary section. Transmissions of this type, especially as used with heavy-duty vehicles, typically have 9, 10, 12, 13, 16 or 18 forward speeds. Examples of such transmissions may be seen by reference to U.S. Pat. Nos. 5,390,561 and 5,737,978, the disclosures of which are incorporated herein by reference.

A transmission output shaft 20 extends outwardly from the transmission 14 and is drivingly connected with the vehicle drive axles 22, usually by means of a prop shaft 24. The illustrated master friction clutch 16 includes a driving portion 16A connected to the engine crankshaft/flywheel and a driven portion 16B coupled to the transmission input shaft 18 and adapted to frictionally engage the driving portion 16A. An upshift brake 26 (also known as an input shaft brake or inertia brake) may be used for selectively decelerating the rotational speed of the input shaft 18 for more rapid upshifting, as is well known. Upshift brake 26 may have two or more selectable levels of retardation or may be actuated to provide infinitely variable levels of retardation. Friction type input shaft or upshift brakes are known in the prior art, as may be seen by reference to U.S. Pat. Nos. 5,655,407 and 5,713,445.

A microprocessor-based electronic control unit (or ECU) 28 is provided for receiving input signals 30 and for processing same in accordance with predetermined logic rules to issue command output signals 32 to various system actuators, such as upshift brake actuator 26A, and the like. ECU 28 may include a clock or other timing device 28A. Microprocessor-based controllers of this type are well known, and an example thereof may be seen by reference to U.S. Pat. No. 4,595,986.

System 10 includes a rotational speed sensor 34 for sensing rotational speed of the engine and providing an output signal (ES) indicative thereof, a rotational speed sensor 36 for sensing the rotational speed of the input shaft 16 and providing an output signal (IS) indicative thereof, and a rotational speed sensor 38 for sensing the rotational speed of the output shaft 20 and providing an output signal (OS) indicative thereof. A sensor 40 may be provided for sensing the displacement of the throttle pedal and providing an output signal (THL) indicative thereof. A shift control console 42 may be provided for allowing the operator to select an operating mode of the transmission system and for providing an output signal ($GR_T$) indicative thereof.

As is known, if the clutch 16 is engaged without slip, the rotational speed of the engine may be determined from the speed of the input shaft and/or the speed of the output shaft and the engaged transmission ratio (ES=IS=OS*GR). Also, with the clutch engaged, input shaft 18, clutch 16 and the engine flywheel and crankshaft will rotate as a unit.

System 10 also may include sensors 44 and 46 for sensing manual operation of the vehicle foot brake (also called service brakes) and/or engine compression brakes (ECB), respectively, and for providing signals FB and EB, respectively, indicative thereof.

The master clutch 16 may be controlled by a clutch pedal 48 or by a clutch actuator 50 responding to output signals from the ECU 28. Alternatively, an actuator responsive to control output signals may be provided, which may be overridden by operation of the manual clutch pedal. In the preferred embodiment, the clutch is manually controlled and used only to launch the vehicle (see U.S. Pat. Nos. 4,850, 236; 5,272,939 and 5,425,689). The transmission 14 may include a transmission actuator 52, which responds to output signals from the ECU 28 and/or which sends input signals to the ECU 28 indicative of the selected position thereof. Shift mechanisms of this type, often of the so-called X-Y shifter type, are known in the prior art, as may be seen by reference to U.S. Pat. Nos. 5,305,240 and 5,219,391. Actuator 52 may shift the main and/or auxiliary section of transmission 14. The engaged and disengaged condition of clutch 16 may be sensed by a position sensor (not shown) or may be determined by comparing the speeds of the engine (ES) and the input shaft (IS).

Fueling of the engine is preferably controlled by an electronic engine controller 54, which accepts command signals from and/or provides input signals to the ECU 28. Preferably, the engine controller 54 will communicate with an industry standard data link DL which conforms to well-known industry protocols such as SAE J1922, SAE 1939 and/or ISO 11898. The ECU 28 may be incorporated within the engine controller 54.

For automated shifting, the ECU 28 must determine when upshifts and downshifts are required and if a single or skip shift is desirable (see U.S. Pat. Nos. 4,361,060; 4,576,065; 4,916,979; 4,947,331 and 6,149,545).

Figure 2:
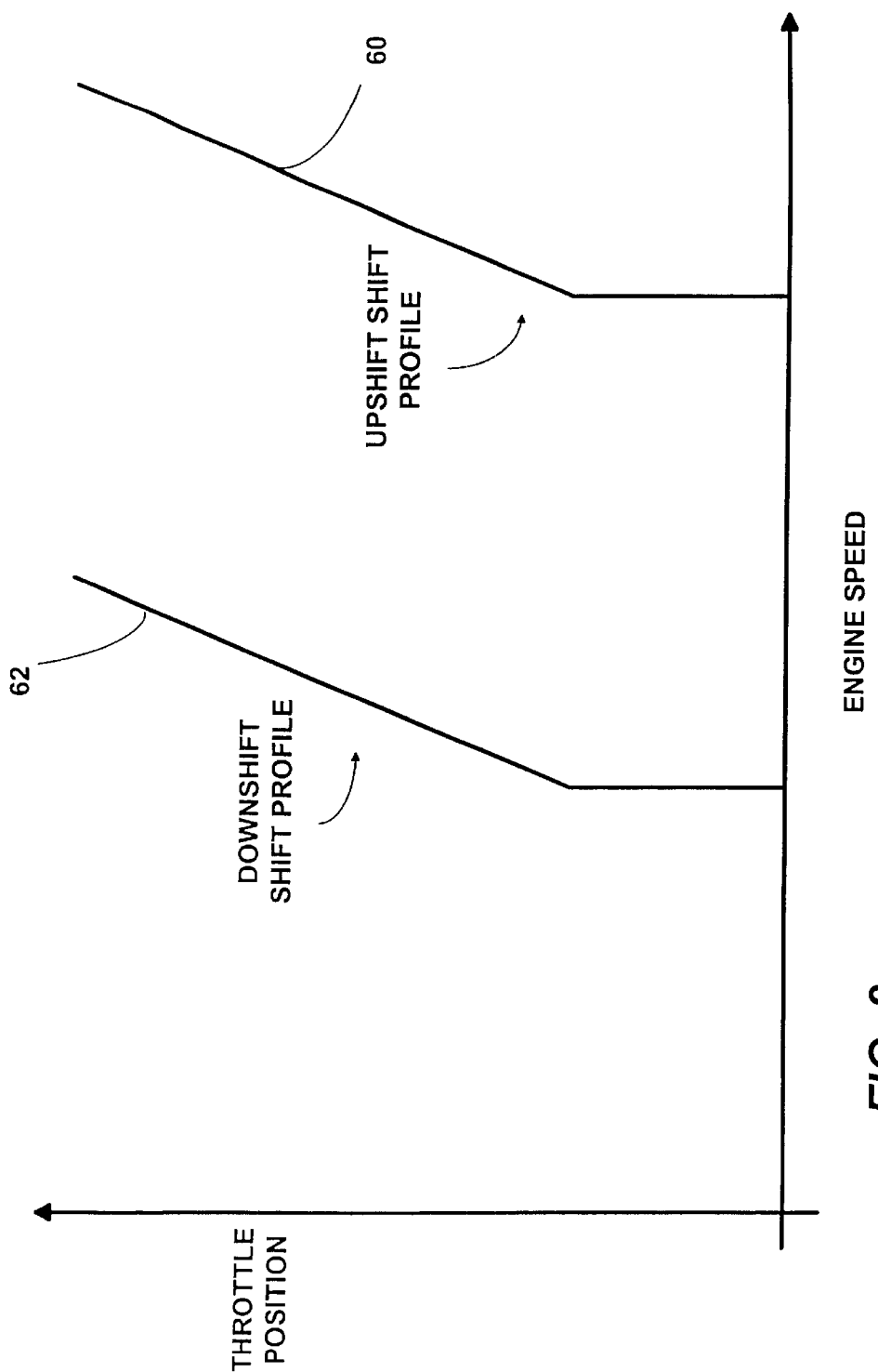
FIG. 2 is a schematic illustration, in graphical format, illustrating shift point profiles for the transmission system of FIG. 1 according to the present invention.

FIG. 2 is a graphical representation of shift point profiles utilized to determine when shift commands should be issued by the ECU 28 to system actuators including the shift actuator 52. Line 60 is the default upshift profile, while line 62 is the default downshift profile. Shift profile 60 is a graphical representation of the engine speeds at which upshifts from a currently engaged ratio (GR) are indicated ($ES_{U/S}$) for various degrees of throttle displacement (ie., demand). As is known, if the vehicle is operating to the right of upshift profile 60, an upshift of transmission 14 should be commanded, while if the vehicle is operating to the left of downshift profile 62, a downshift should be commanded. If the vehicle is operating in between profiles 60 and 62, no shifting of the transmission is then required.

According to the control of a preferred embodiment of the present invention, if an upshift from a currently engaged ratio (GR) is required (i.e., if at current throttle displacement engine speed (ES) is greater than the upshift engine speed ($ES_{U/S}$) on shift point profile 60), a sequence is initiated for identifying the desirable upshift target ratio ($GR_{TARGET}$), if any. In a preferred embodiment, the control, in sequence, will evaluate unaided and/or aided skip upshifts and then unaided single upshifts and then upshift brake-aided single upshifts for desirability and command an upshift to the first potential target ratio deemed desirable.

In a preferred embodiment, a maximum time for completion of an upshift is established based upon considerations for shift quality, vehicle performance, etc. For heavy-duty trucks, by way of example, this time value may have a value of about 0.8 to 2.0 seconds.

A two-part feasibility test is established:
(1) Will the engine speed be at a synchronous value above a preselected minimum engine speed $ES_{MIN}$, given current/assumed engine and vehicle deceleration rates? The $ES_{MIN}$, by way of example, is selected at about 1100 to 1300 rpm, which for a typical heavy-duty diesel engine is at or near a peak torque rpm.

The engine deceleration rate may be evaluated with or without the use of engine braking. This logic may be appreciated by reference by U.S. Pat. Nos. 5,335,566 and 5,425,689, the disclosures of which are incorporated herein by reference. The friction upshift brake 26 may be used separately or in addition to an engine brake. Use of engine brakes (also called exhaust and Jake brakes) to enhance upshifting is known, as may be seen by reference to U.S. Pat. No. 5,409,432; and (2) At completion of a proposed upshift, will torque at the drive wheels provide sufficient torque for at least minimal vehicle acceleration? (See U.S. Pat. Nos. 5,272,939 and 5,479,345, the disclosures of which are incorporated herein by reference.

Feasibility also may require that a potential upshift be expected to be completed in a time (T) less than the maximum acceptable time (T<$T_{MAX}$). If one or more of these parts of the feasibility test are not satisfied, the proposed upshift to an evaluated target ratio (GR+1, 2, 3, . . . ) is not feasible and will not be commanded.

To provide a maximized upshift braking effect, while thermally protecting the friction-type upshift brake, the maximum additional input shift deceleration available using the friction upshift brake 26 is calculated using a simulation technique wherein the expected brake temperature ($TEMP_P$) at completion of a potential shift is set equal to a maximum allowable temperature to determine a maximum additional input shaft deceleration value. For example, as disclosed in copending application Ser. No. 09/573,873, $TEMP_p$, the predicted temperature may be calculated or simulated from a relationship such as:

$$TEMP_{MAX} = TEMP_p = TEMP_i + TEMP_b - TEMP_c$$

where:

$TEMP_p$=predicted brake temperature at completion of an upshift brake-aided upshift;

$TEMP_i$=initial (present) brake temperature;

$TEMP_b$=temperature rise due to brake-aided upshift; and $TEMP_c$=temperature decline during brake-aided upshift.

$TEMP_i$, the simulated initial or present temperature of the brake, is the greater of (i) a minimum value (about 200° F.) or (ii) the last predicted value decreased at a selected cooling rate since the last brake actuation (such as −7° F. per second).

$TEMP_b$, the expected temperature rise due to brake actuation, is a function of one or more of (i) a target engine deceleration, (ii) the natural engine decay rate, (iii) engine inertia (I), often available on the data link, (iv) present engine speed (RPM), (v) step of proposed shift; (vi)t he rate of engine deceleration; and (vii) a constant.

$TEMP_c$, the cooling during the assisted shift, is a function of (i) a transmission sump temperature ($TEMP_s$), (ii) an expected shift time and (iii) a second constant.

As may be seen, the expected temperature of the brake at completion of a proposed shift ($TEMP_p$) may be simulated using various system parameters and may be compared or set equal to a maximum reference value ($TEMP_{MAX}$) (such as about 350° F.) to determine if upshift brake assist for a particular upshift is allowable and/or the maximum level of added retardation that the brake can provide without risk of undue wear or damage.

The parameters used to simulate the predicted temperature ($TEMP_p$) may include one or more of (i) a simulated initial brake temperature, (ii) time since last brake actuation, (iii) an estimated brake cooling rate when not active, (iv) temperature at completion of last assisted upshift, (vi) a desired engine deceleration rate, (vii) an engine decay rate, (viii) present engine speed, (ix) synchronous engine speed, (x) engine inertia, (xi) ratio step, (xii) calculated shift time, (xiii) cooling rate during brake actuation and/or (xiv) various assumed constants. Of course, less than or more than the above parameters may be used to estimate or simulate an expected brake temperature ($TEMP_p$). A prior art temperature simulation technique may be seen by reference to U.S. Pat. No. 4,576,263, the disclosure of which is incorporated herein by reference.

The "additional deceleration" provided by the upshift brake is deceleration in addition to the natural decay rate of the engine. The input brake 26 may have several levels of engine rotational speed retardation or may provide infinitely valuable levels of retardation.

As used herein, deceleration is taken as a positive quantity, i.e. a greater retarding force will result in a more positive or greater deceleration. For example, −5 RPM/sec$^2$ is a smaller deceleration then −10 RPM/sec$^2$.

In addition to calculating the maximum allowable additional engine speed deceleration available from the upshift brake (MAX Decel), the control logic will also calculate or determine;

a) the additional engine speed deceleration necessary to complete the shift in a desirable time (Desired Decel). The desirable time may be, for example, between 1.0 and 1.2 seconds; and b) the additional engine deceleration necessary to complete the proposed upshift at above a selected speed engine (Required Decel).

The control logic will then issue command output signals to the transmission shifter 52, the engine controller 54 and/or the input brake actuator 26A according to the following logic.

If an upshift is required, i.e. if , for a given throttle position, ES is to the right of upshift profile 60, shifts to a potential target gear ration $GR_T$ are evaluated as follows:

a) if the desired deceleration is less then zero (Desired Decel<0), then the shift to $GR_T$ is initiated without the use of the inertia or upshift brake 26.

b) if the maximum deceleration is less than the required deceleration (Max Decel<Required Decel), then the proposed upshift to GRT is not initiated.

c) if the desired deceleration is greater than zero (Desired Decel >0) and required deceleration is less than maximum deceleration (Required Decel<Max Decel) and desired deceleration is greater than required deceleration (Desired Decel>Required Decel), then initiate the shift to $GR_T$ using the upshift brake 26 at the retardation level for desired deceleration; and (d) if the desired deceleration is greater than zero (Desired Decel >0), and the required deceleration is less than maximum deceleration (Required Decel<Max Decel) and desired deceleration is less than required deceleration (Desired Decel<Required Decel) then initiate the upshift to $GR_T$ using the upshift brake 26 at the retardation level providing required deceleration.

This logic differs from logic utilized for evaluating potential upshifts aided by engine brakes, as using the engine brake (usually an engine compression brake) for upshifts is not a first option due to potentially objectionably noisy and/or slower and/or rough shifting, other than for wear, no such drawback is associated with use of the friction upshift brake 26.

Figure 3A:
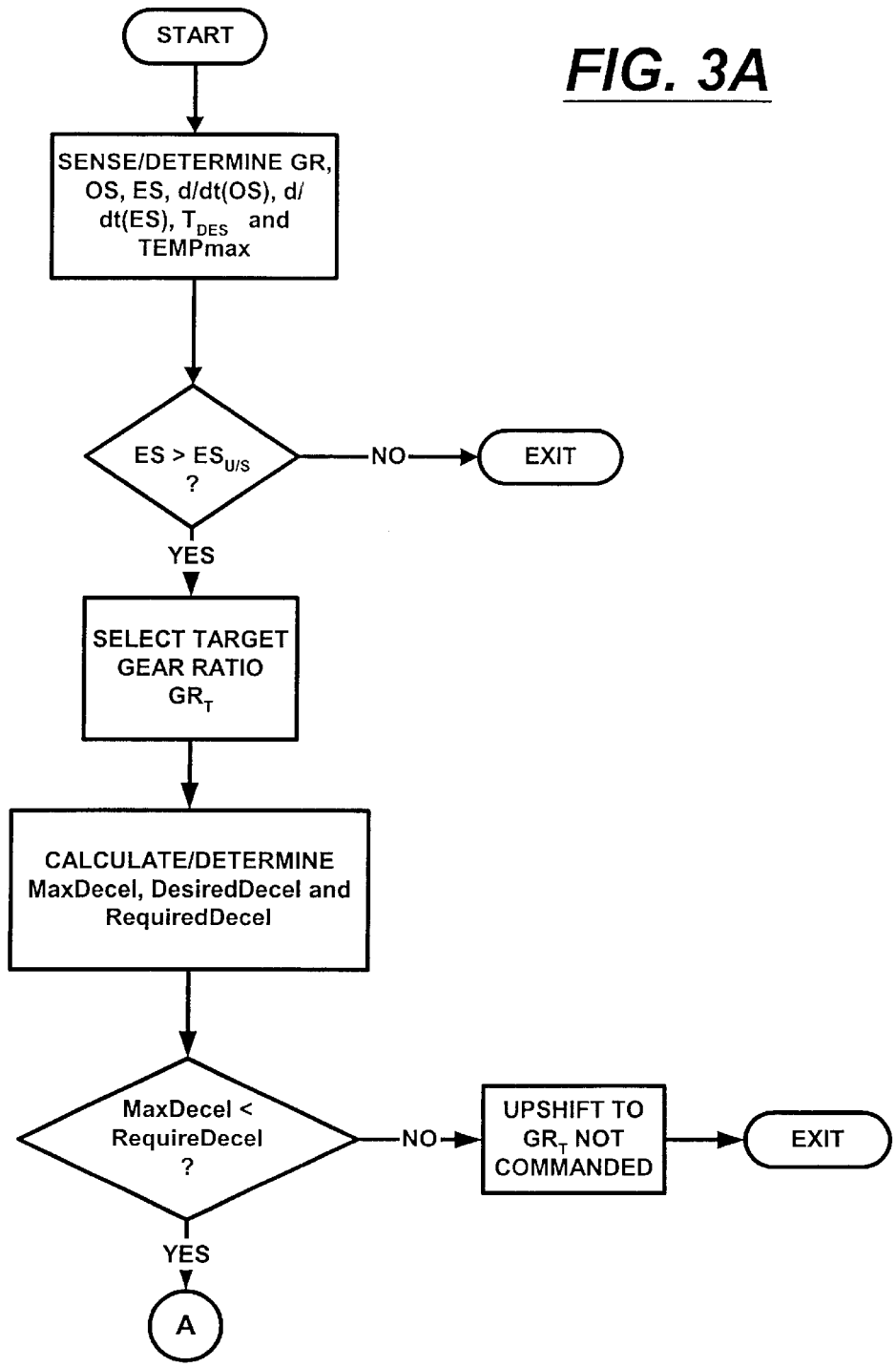
FIGS. 3A and 3B are schematic illustrations, in flow chart format, of the control of the present invention.
Figure 3B:
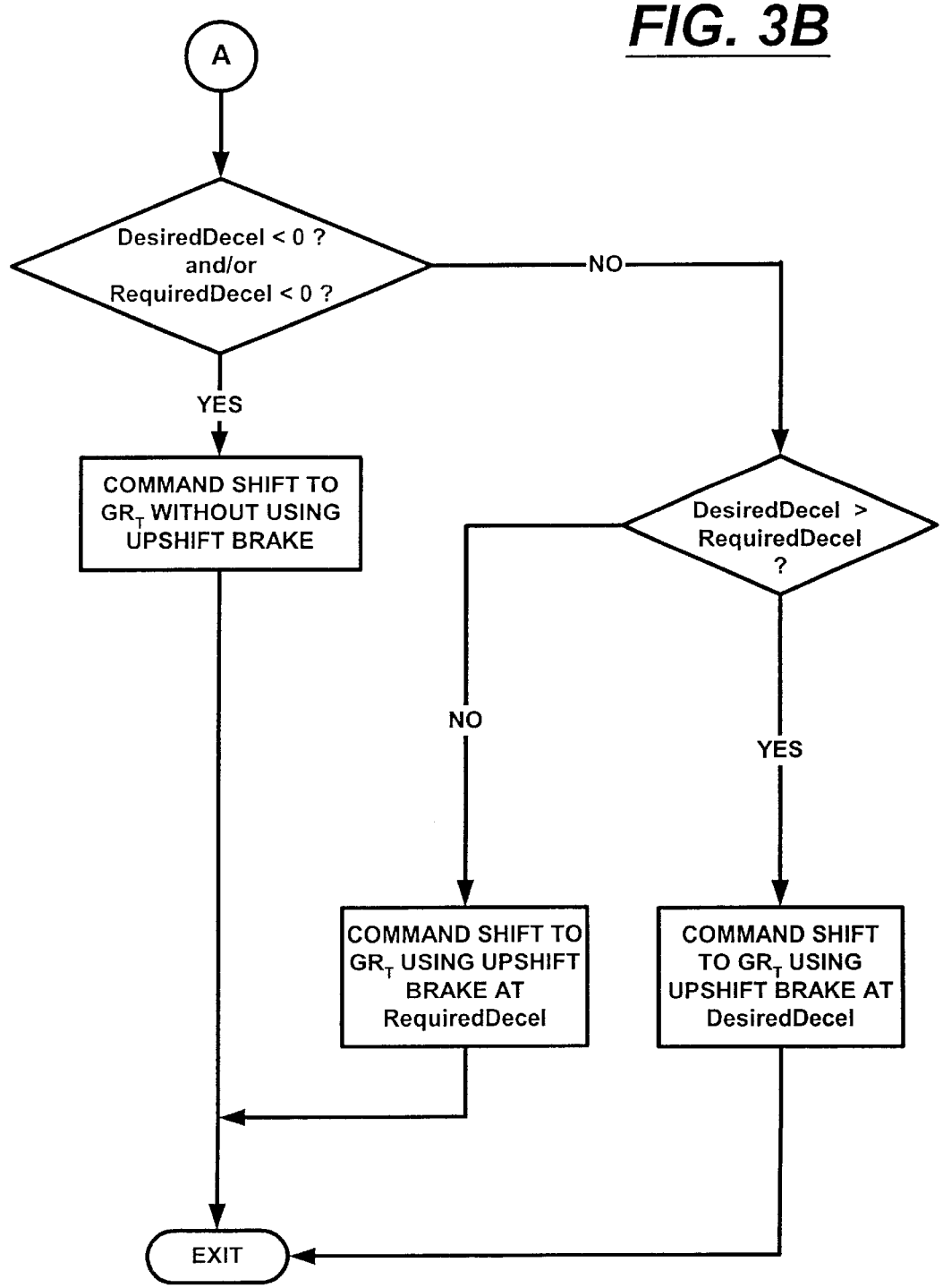

FIGS. 3A and 3B illustrate the present invention in a flow chart format.

Although the present invention has been described with a certain degree of particularity, it is understood that the description of the preferred embodiment is by way of example only and that numerous changes to form and detail are possible without departing from the spirit and scope of the invention as hereinafter claimed.

We claim:

1. A method for controlling automatic upshifting in a vehicular automated mechanical transmission system (10) for a vehicle comprising a fuel-controlled engine (12), a multiple-speed mechanical transmission (14) having an input shaft (18) driven by said engine, a friction upshift brake (26) for selectively retarding rotation of said input shaft, and a controller (28) for receiving input signals (30) including one or more of signals indicative of engine speed (ES), input shaft speed (IS), engaged gear ratio (GR) and vehicle speed (OS), and to process said input signals in accordance with logic rules to issue command output signals (32) to transmission system actuators including a transmission actuator (52) effective to shift said transmission and a brake actuator (26A) effective to operate said brake, said brake selectively actuated to provide selected degrees of retardation to said input shaft for varying input shaft deceleration, said logic rules including rules for:
  (a) establishing upshift feasibility criteria whereby upshifts into a target gear ratio are considered feasible only if, under sensed vehicle operating conditions, said criteria is satisfied, and
  (b) determining if upshifts under consideration are feasible, said method characterized by the steps of:
    (i) establishing a maximum allowable temperature ($TEMP_{MAX}$) for said brake;
    (ii) determining an expected input shaft deceleration (DECAY DECEL) in the absence of brake actuation;
    (iii) determining a maximum additional input shaft deceleration (MAX DECEL), in addition to said expected input shaft deceleration, available without causing brake temperature to exceed said maximum temperature at completion of an upshift;
    (iv) determining a required additional input shaft deceleration (REQ DECEL), in addition to said expected input shaft deceleration, required to complete an upshift under current vehicle operating conditions and satisfying said criteria;
    (v) determining a desired additional input shaft deceleration (DESIRED DECEL), in addition to said expected input shaft deceleration, to complete an upshift in less than a reference period of time, and within said criteria under current vehicle operating conditions;
    (vi) if said maximum additional deceleration is less than said required additional deceleration (MAX DECEL<REQ DECEL), then inhibit said upshift;
    (vii) if said desired additional acceleration is less than zero (DESIRED DECEL<0), then initiate said upshift without use of said brake;
    (viii) if said desired additional deceleration is greater than said required additional deceleration (DESIRED DECEL>REQ DECEL), then initiate said upshift using said brake to provide said desired additional deceleration; and
    (ix) if said desired additional deceleration is less than said required additional deceleration (DESIRED DECEL<REQ DECEL), then initiate said upshift using said brake to provide said required additional deceleration.

2. The method of claim 1 wherein said reference time is about 0.8 to 1.5 seconds.

3. The method of claim 1 wherein said reference time is about 1.2 seconds.

4. The method of claim 1 wherein the determination of said maximum additional shaft deceleration of step (b)(iii) is determined as a function of system operating parameters including two or more of (a) a simulated current brake temperature ($TEMP_t$); (b) time since last brake actuation (t); (c) inertia of engine (I); (d) transmission sump temperature ($TEMP_s$); (e) ratio step (R) of upshift under consideration; and (f) time in which upshift under consideration is expected to be completed (s).

5. The method of claim 1 wherein said criteria include at least two of:
  (a) upshifts can be accomplished within a time no greater than a predetermined maximum available time ($T<T_{MAX}$);
  (b) substantial synchronization can be obtained above a predetermined engine speed; and
  (c) at engagement of the target ratio, the vehicle will be capable of at least a predetermined acceleration (dOS/dt).

6. A method for controlling automatic upshifting in a vehicular automated mechanical transmission system (10) for a vehicle comprising a fuel-controlled engine (12), a multiple-speed mechanical transmission (14) having an input shaft (18) driven by said engine, a friction upshift brake (26) for selectively retarding rotation of said input shaft, and a controller (28) for receiving input signals (30) including one or more of signals indicative of engine speed (ES), input shaft speed (IS), engaged gear ratio (GR) and vehicle speed (OS), and to process said input signals in accordance with logic rules to issue command output signals (32) to transmission system actuators including a transmission actuator (52) effective to shift said transmission and a brake actuator (26A) effective to operate said brake, said brake selectively actuated to provide selected degrees of retardation to said input shaft for varying input shaft deceleration, said logic rules including rules for:
  (a) establishing upshift feasibility criteria whereby upshifts into a target gear ratio are considered feasible only if, under sensed vehicle operating conditions, said criteria is satisfied, and
  (b) determining if upshifts under consideration are feasible, said method characterized by the steps of:
    (i) establishing a maximum allowable temperature ($TEMP_{MAX}$) for said brake;
    (ii) determining an expected input shaft deceleration (DECAY DECEL) in the absence of brake actuation;
    (iii) determining under current vehicle operating conditions, a maximum additional input shaft deceleration (MAX DECEL), in addition to said expected input shaft deceleration, available without causing brake temperature to exceed said maximum temperature at completion of an upshift;
    (iv) determining a required additional input shaft deceleration (REQ DECEL), in addition to said expected input shaft deceleration, required to complete an upshift under current vehicle operating conditions; and satisfying said criteria;
    (v) determining a desired additional input shaft deceleration (DESIRED DECEL), in addition to said expected input shaft deceleration, to complete an upshift in less than a reference period of time, and within said criteria under current vehicle operating conditions;
    (vi) if said maximum additional deceleration is less than said required additional deceleration (MAX DECEL<REQ DECEL), then inhibit said upshift;

(vii) if said desired additional acceleration is less than zero (DESIRED DECEL<0), then initiate said upshift without use of said brake; and (viii) if said desired additional deceleration is greater than said required additional deceleration (DESIRED DECEL>REQ DECEL), then initiate said upshift using said brake to provide said desired additional deceleration.

7. A method for controlling automatic upshifting in a vehicular automated mechanical transmission system (10) for a vehicle comprising a fuel-controlled engine (12), a multiple-speed mechanical transmission (14) having an input shaft (18) driven by said engine, a friction upshift brake (26) for selectively retarding rotation of said input shaft, and a controller (28) for receiving input signals (30) including one or more of signals indicative of engine speed (ES), input shaft speed (IS), engaged gear ratio (GR) and vehicle speed (OS), and to process said input signals in accordance with logic rules to issue command output signals (32) to transmission system actuators including a transmission actuator (52) effective to shift said transmission and a brake actuator (26A) effective to operate said brake, said brake selectively actuated to provide selected degrees of retardation to said input shaft for varying input shaft deceleration, said logic rules including rules for:

(a) establishing upshift feasibility criteria whereby upshifts into a target gear ration are considered feasible only if, under sensed vehicle operating conditions, said criteria is satisfied, and (b) determining if upshifts under consideration are feasible, said method characterized by the steps of:

(i) establishing a maximum allowable temperature ($TEMP_{MAX}$) for said brake;

(ii) determining an expected input shaft deceleration (DECAY DECEL) in the absence of brake actuation;

(iii) determining under current vehicle operating conditions, a maximum additional input shaft deceleration (MAX DECEL), in addition to said expected input shaft deceleration, available without causing brake temperature to exceed said maximum temperature at completion of an upshift;

(iv) determining a required additional input shaft deceleration (REQ DECEL), in addition to said expected input shaft deceleration, required to complete an upshift under current vehicle operating conditions; and satisfying said criteria;

(v) if said maximum additional deceleration is less than said required additional deceleration (MAX DECEL<REQ DECEL), then inhibit said upshift; and (vi) determining a desired additional input shaft deceleration (DESIRED DECEL), in addition to said expected input shaft deceleration, to complete an upshift in less than a reference period of time, and within said criteria under current vehicle operating conditions;

(vii) if said desired additional acceleration is less than zero (DESIRED DECEL <0), then initiate said upshift without use of said brake.

* * * * *